United States Patent
Guenther

[11] 3,754,867
[45] Aug. 28, 1973

[54] CARBON DIOXIDE SENSING SYSTEM
[75] Inventor: Karl R. Guenther, Stoughton, Wis.
[73] Assignee: Bjorksten Research Laboratories, Inc., Madison, Wis.
[22] Filed: Sept. 20, 1971
[21] Appl. No.: 181,834

Related U.S. Application Data
[63] Continuation-in-part of Ser. No. 97,072, Dec. 11, 1970, Pat. No. 3,694,164, and a continuation-in-part of Ser. No. 118,022, Feb. 23, 1971, abandoned.

[52] U.S. Cl............ 23/254 R, 23/232 R, 23/253 TP
[51] Int. Cl.. G01n 21/12, G01n 21/20, G01n 21/22
[58] Field of Search................... 23/254 E, 232 E, 23/253 TP

[56] References Cited
UNITED STATES PATENTS
3,404,962  10/1968  Medlar et al. .................... 23/253
3,572,994  3/1971  Hochstrasser...................... 23/254

Primary Examiner—Morris O. Wolk
Assistant Examiner—R. E. Serwin
Attorney—Johan Bjorksten

[57] ABSTRACT

Low cost system for sensing carbon dioxide content of ambient air. It comprises a thin layer of a chemical reversibly absorbent for carbon dioxide, the pH of which changes in relation with the amount of absorbed carbon dioxide at any time; an indicator present in said film which changes color in accordance with the pH, and a photoelectric system to produce an electric signal proportionate to said color change.

In this system substantial independence of humidity is gained by the use as principal solvent in the said thin layer of an ionizing solvent having a vapor pressure in the range of 0–10 mm at temperatures up to 150°F, and compatible with the other components of the system.

3 Claims, 6 Drawing Figures

PATENTED AUG 28 1973 3,754,867

CARBON DIOXIDE SENSING SYSTEM

BACKGROUND DATA AND PRIOR ART

This is a continuation-in-part of U.S. Pat. 3,694,164 issued Sept. 26, 1972, and of abandoned application Ser. No. 118,022 filed Feb. 23, 1971. It is directed to an improvement in the sensor there disclosed with respect to simplicity, reliability and ruggedness, and to a system for its use.

OBJECTS OF THE INVENTION

An object of the invention is an improved $CO_2$ sensor having exceptional rapidity and particularly adapted to electronic recording and/or control.

Another object is an improved $CO_2$ sensing system.

Further objects will become apparent as the following detailed description proceeds.

BRIEF STATEMENT OF THE INVENTION

In accordance with this invention I prepare a sensor by impregnating a porous translucent sheet material with a composition comprising a stable basic substance such as those described in the above mentioned parent application or alternatively inorganic bases such as those described below, and an evaporattion resistant carrier substance, not greatly affected by changes in atmospheric humidity, yet not interfering with the indicator color changes essential for the function of this invention. Suitable are generally ionizing or at least slightly water retentive solvents having a vapor pressure lower than 10 mm at 150°F and particularly suitable are glycols having a molecular weight in the range 90–300, such as diethylene glycol, triethylene glycol and tetraethylene glycol. Some glycols beyond this range, such as propylene glycol and hexaethylene glycol, and substitution products where the substituent does not interfere with the properties stated above to have particular significance for this invention may be used in some instances, where a relatively narrower range of sensing will suffice, as further indicated below.

The composition further includes a pH indicator dyestuff, changing its light absorbency within the pH range of 6–10 and preferably within the range of 7–8. I then encapsulated the sheet material thus impregnated between thin protective sheets, usually between 0.1 and 10 mil, and preferably between one-fourth and 2 mil thick of a film material inert to the said impregnating material and substantially permeable to carbon dioxide, and place it in the path of a light beam, directed at an electronic light sensing device such as a photocell, or a cell capable of converting light of the impinging wavelength to electricity.

Instead of using an impregnated porous carrier, I may also prepare the sensing composition in the form of a transparent, gelled film.

DRAWINGS

The invention is further illustrated by the drawings, of which

DETAILED DESCRIPTION OF THE INVENTION

A sensing element was prepared by dipping a sheet of Whatman filter paper No. 3 into a solution composed of 2 ml 5 N aqueous potassium hydroxide, 2 ml of an aqueous solution of 5 percent Phenol red and 5 percent potassium hydroxide, and 46 ml triethylene glycol, and then wiping off the excess of solution.

This was then placed between two pieces of 1 mil polyethylene film and the edges of the film heat sealed, or otherwise joined in a leak proof manner, for example by repeated folding under pressure clamps or by the use of a suitable adhesive.

The sealed sensing element thus prepared was then mounted between two holding pieces of firm supportive sheet material, such as one-eighth inch plywood, polystyrene sheet, polyvinyl chloride sheet, "Bakelite," or the like, each containing an aperture in the center, and the sheets were glued or firmly clamped together. For example, the plywood could be conveniently joined with a caseinresorcinol glue, the polyvinyl chloride with a solution of the same plastic in methyl ethyl ketone, and the polystyrene with a solution of polystyrene in toluene.

Figure 1:
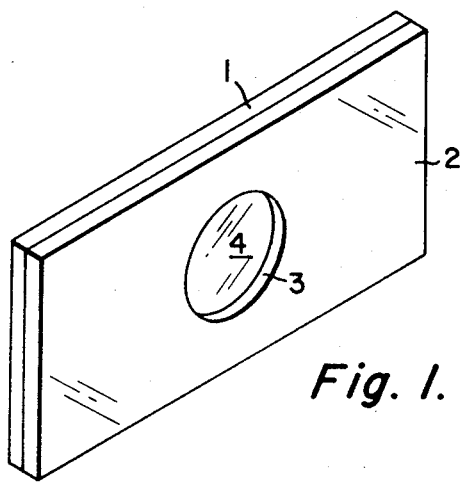
FIG. 1 is a representation of the sensor cell.

The mode of assembly of the sensing element is shown in FIG. 1, in which 1 and 2 are stiff holding members which form the frame for the sensing element, 3 the opening in which the sensing element is mounted, and 4 the sensing element as a whole.

Figure 2:
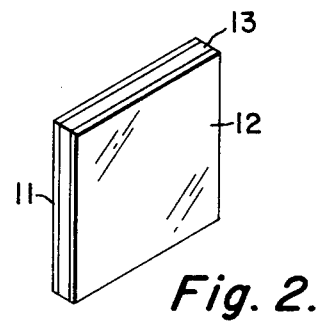
FIG. 2 is a description of the sensing element.

FIG. 2 shows the sensing element in detail, 11 and 12 being 1 mil polyethylene films, low density polyethylene being preferred, and 13 the porous carrier impregnated with the carbon dioxide equilibrating indicator carrying composition.

Figure 4:
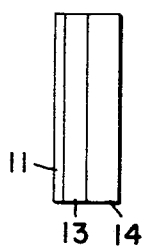
FIG. 4 is an alternate description of the sensing element.

FIG. 4 shows an alternative modification, in which the sensor and one confining film are the same as in FIG. 2, but the other side of the thin layer sensor in confined by a solid wall. This can be done simply by omitting the hole on one side of the frame, thus making the thin layer a part of the larger device to gain ruggedness at the expense of easy replacement and interchangeability. This may be preferred for one time applications, as in expendable carbon dioxide seeking devices. Also, the other wall may be made of an inert metal such as anodized aluminum, titanium, or gold-plated steel, in order to provide a heat sink or otherwise a readily temperature controllable element for precision measurements. In this case the color changes indicative of cabon dioxide content would be read in reflected, rather than transmitted, light, as will be further explained below.

Figure 3:
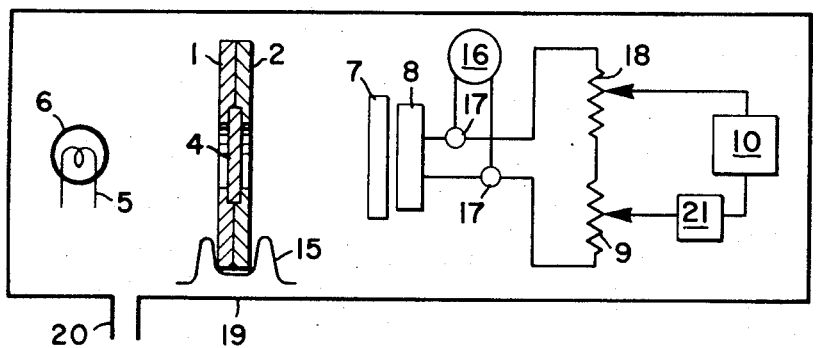
FIG. 3 is schematic of the wiring diagram.

In order to translate the changes in light reflectance or transmission of the sensing element into an electric signal, I employ a system such as that shown in FIG. 3. A practically constant light source such as a 6v. 0.15 amp bulb 6 powered by a 6v constant power supply 5 emits a light v passes thru the sensor element of FIG. 1 mounted in brackets 15, onto a means for translating light into an electric signal, such as for example a photocell 8. I have found the cell known commercially as B2M–C particularly suitable for the assembly here described. When an indicating instrument is desired, the output signal is measured directly on a voltmeter 16, connected to the photocell by means of switches 17. Alternatively, when a continuous recording is desired, the signal will be switched to suitable recording means, in the present example a millivolt recorder 10 supplied through a voltage splitter which may consist of a 25k variable resistor 9. A light filter, such as a Wratten filter No. 58, will serve to eliminate nonsignificant optical energies, thereby enhancing the precision and sensitivity of the instrument. Alternatively, if recording is not required, the output signal of the photocell may be directed to a voltage meter 16, calibrated to directly indicate the $CO_2$ percentage.

The sensing system is enclosed in a light tight box 19, to exclude stray light. The light source 6 was connected to a 6 volt transformer 5 powered by a SOLA constant voltage transformer. Air was introduced into the gas connector 20 and the zero adjustment commonly a part of Tracor recorders (not shown) was turned as far clockwise as possible. The resistors 9 and 18 in the voltage splitter were then adjusted so that the recorder read 0.02 millivolts. By means of rotometers (not shown), levels of 7.2 and 16.3 percent $CO_2$ in air were passed through the cell and the recorder readings noted. Via the use of a gas bubbler and saturated solutions of $CaCL_2$, $Na_2Cr_2O_7$ and $K_2Cr_2O_7$ the humidity of the air was controlled at 31, 53 and 98 percent respectively. With the recorder set at 0.20 millivolts with air containing 0.03 percent $CO_2$ and a relative humidity of 98 percent the following readings were obtained:

|        | Millivolts Relative Humidity % | | |
|--------|------|------|------|
| % $CO_2$ | 98   | 53   | 31   |
| 0      |      | 0.09 | 0.20 0.05 |
| 7.2    |      | 0.27 | 0.42 0.21 |
| 16.3   |      | 0.44 | 0.57 0.38 |

The effect of humidity was cancelled out by connecting a humidity sensing resistor 21 in series with the voltage splitter and the following data were obtained:

|        | Millivolts Relative Humidity % | | |
|--------|------|------|------|
| % $CO_2$ | 98   | 53   | 31   |
| 0      | 0.20 | 0.20 | 0.20 |
| 7.2    | 0.42 | 0.38 | 0.38 |
| 16.3   | 0.57 | 0.58 | 0.55 |

For the preparation of the sensing solution a number of water miscible high boiling liquids may be substituted for the triethylene glycol. These include polyglycols such as ethylene glycol, glycerol, etc., and generally substances compatible with the other components of said systems, solvents for the indicator dyes used therein and nonpenetrating for the said confining membranes, and further having a vapor pressure lower than 5 mm at 30°C. Other substances having these properties are, for example, aliphatic alcohols $C_{10}$ or larger, silicone oils, plasticizer esters, dioctyl phthalate, etc., and alkanes $C_{16}$ or higher.

For the sensing membrane a number of absorbent translucent materials may be used such as nonwoven polyolefin fibers such as for example polypropylene fabric, filter paper, nonwoven or woven nylon or polyester or polyether pilyether fabrics, acrylate fibers, and the like.

For the sensor film any translucent or transparent film which is permeable to $CO_2$ may be used such as microporous polypropylene, cellulose acetate butyrate, polyvinyl chloride, and the like.

For the cell holder any rigid opaque material may be used including plastics, ceramics, wood or metal.

In addition, a photoconductor or any other light sensitive electrical cell may be used with the appropriate filter. I am using the term "photocell" broadly to include all photosensitive devices producing electric signals as a result of exposure to light.

For a substitute for phenol red a number of other acid base indicators may be used, such as for example brilliant yellow, meta cresol purple, cresol red, neutral red, M-nitrophenol, and m-dinitrobenzoylene urea. In general, indicators showing color changes within the hydrogen ion concentration range of pH 6.4 to pH 8.8 or any part thereof are suitable for the practice of this invention.

The system for translating optical differences to electrical signals does not necessarily have to be based on transmission of passing light as shown in the above example. I may also employ the light reflected by the sensing element directly, or I may use light in a V-formed path reflected by a reflector surface consituting one side of the reflector element. These arrangements are shown in FIGS. 5 and 6 respectively, both of which show consequent modifications in a part of the system of FIG. 3.

Figure 5:
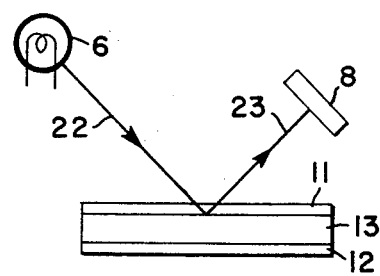
FIG. 5 is an alternate arrangement of the light source and photocell as is FIG. 6.

In FIG. 5, light generated by bulb 6 passes as a beam 22 at a conveient angle (usually 10°–60°) to the sensor assembly, passes the outer film 11 and is reflected by the surface of the sensor onto the photocell 8, which generates the electric signal translated further by the associated equipment described above and shown in FIG. 3. Thus, the measurement depends here on the changes with $CO_2$ content, of the light reflected by the surface of the sensor.

Figure 6:
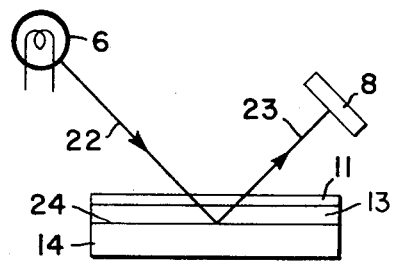

FIG. 6 shows a different embodiment in which the light beam 22 passes not only the confining $CO_2$-permeable outer film 11, but also the $CO_2$-reactive sensor layer itself, being reflected by a mirror surface 24 upon which the sensor layer rests. This mirror surface is preferably backed by a supporting layer 14 of which only passable mechanical strength properties are required.

The light beam thus passes twice, and at an angle, thru the sensor layer, thereby attaining a miximal path length through a layer of minimal thickness. This arrangement minimizes the time lag thus making possible an extremely rapidly responsive instrument. For example, with an incidence angle of 10° the beam passes through a layer 5.75 times the perpendicular thickness of the layer.

To maximize the efficacy of this last mentioned arrangement, it is desirable to employ a transparent sensor film. For this purpose I prefer to employ a transparent sensor film compounded by gelling the $CO_2$-reactive liquid by means of a compatible colloidal gelling agent, such as for example polyvinyl alcohol, polyvinyl pyrrolidene, polyacrylamide, or gelatin. Suitable formulations are for example: Soak 10gr 225–300 Bloom gelatin in water in 10gr water over night. Warm 100gr triethylene glycol and 30ml water to 50°C. Add the pre-soaked gelatin at the same temperature with slow stirring. Add 0.03 percent on the gelatin of $Cr_2(SO_4)_3$ dissolved in some water. Let stand 2 hours or over night at 50°C to let air bubbles rise. Pour from the bottom or under spatula blade to remove air foam on top. The resultant film should be clear and resilient.

As an alternate for the use of a filter paper carrier I may also use a polymethacrylate woven fabric or a polypropylene nonwoven sheet. A piece of the woven methacrylate sheet with a pore size about 0.5μ was dipped into the sensing solution and then blotted with a paper towel to remove the excess. It was then placed between two pieces of 1 mil polyethylene film and the edges of the film heat sealed.

In this description I use the word "equilibrate" to indicate the property of reaching an equilibrium balance between the substance being measured in the ambient fluid, for example carbon dioxide in air or in water or sulfur dioxide similarly present as well as other gaseous acidic anhydrides, on the one hand, and the same substance bound to the reactive composition in the sensor of this invention, so that a definite percentage of the substance being measured in the sensor will result from exposure to any definite percentage of the same substance in the ambient fluid.

While the examples have particularly described the application of this invention to the measurement of carbon dioxide in air, it is apparent that the principle of the invention is applicable to any system containing an acid reacting anhydride in water. Thus it could be applied to determining the content of phthalic or malonic anhydrides in a gas stream, or of carbon dioxide in water. In the latter case I would prefer to employ a confining film of lower water permeability than polyethylene, but with adequate permeability for carbon dioxide. For example, films of polystyrene and/or its homologues are potentially useful for this purpose.

It is thus seen that the inventive concept is capable of considerable variations without departure from the spirit and scope thereof.

Having thus disclosed my invention, I claim:

1. A gas analyzer comprising a reflectant layer; superimposed thereon a solid translucent layer comprising a sensor composition, said translucent layer having one surface on contact with the medium to be analyzed; a light source an interposed gas permeable layer and a light measuring means positioned on the exposed side of said translucent layer so that the light from said light sources follows a V-formed path, passing through the said sensor composition once between light source and reflector, and a second time on the way from reflector to light measuring means, both times passing through the said solid translucent layer of sensor composition.

2. The gas analyzer of claim 1, in which the said translucent layer consists of one sensor layer and one gas permeable protective film.

3. The gas analyzer of claim 2, in which said translucent layer is less than 20 mil thick and said permeable protective film is less than 10 mil thick.

* * * * *